(12) United States Patent
Bourrigaud et al.

(10) Patent No.: US 9,296,854 B2
(45) Date of Patent: Mar. 29, 2016

(54) CROSSLINKED NANOSTRUCTURED CAST SHEETS

(75) Inventors: Sylvain Bourrigaud, Morlanne (FR); Sylvie Cazaumayou, Dax (FR); Stephanie Pery, Lons (FR)

(73) Assignee: Arkema France, Colombes (FR)

( * ) Notice: Subject to any disclaimer, the term of this patent is extended or adjusted under 35 U.S.C. 154(b) by 2 days.

(21) Appl. No.: 13/996,816

(22) PCT Filed: Dec. 22, 2011

(86) PCT No.: PCT/FR2011/053168
§ 371 (c)(1),
(2), (4) Date: Aug. 26, 2013

(87) PCT Pub. No.: WO2012/085487
PCT Pub. Date: Jun. 28, 2012

(65) Prior Publication Data
US 2015/0038650 A1    Feb. 5, 2015

(30) Foreign Application Priority Data

Dec. 23, 2010  (FR) ..................... 10 61113

(51) Int. Cl.
*C08F 299/04*   (2006.01)
*B29C 39/00*    (2006.01)
*C08F 287/00*   (2006.01)
*C08F 293/00*   (2006.01)
*C08K 5/00*     (2006.01)
*B29K 33/00*    (2006.01)

(52) U.S. Cl.
CPC ............. *C08F 299/04* (2013.01); *B29C 39/003* (2013.01); *C08F 287/00* (2013.01); *C08F 293/005* (2013.01); *B29K 2033/08* (2013.01); *C08F 2438/02* (2013.01); *C08K 5/0025* (2013.01)

(58) Field of Classification Search
None
See application file for complete search history.

(56) References Cited

U.S. PATENT DOCUMENTS

| 7,144,952 B1 | 12/2006 | Court et al. |
| 8,013,062 B2 | 9/2011 | Ruzette et al. |
| 2009/0306301 A1 * | 12/2009 | Guerret et al. ................. 525/267 |
| 2010/0010172 A1 * | 1/2010 | Hong et al. ................. 525/92 E |
| 2011/0183135 A1 | 7/2011 | Gerard |

FOREIGN PATENT DOCUMENTS

| WO | WO 02/055573 | 7/2002 |
| WO | WO 03061937 A1 * | 7/2003 ............. B29C 39/00 |

OTHER PUBLICATIONS

Griller, David et al., "Persistent Carbon-entered Radicals" *Accounts of Chemical Research*, vol. 9, 1976, pp. 13-19.
Greszta, Dorata, et al., "Mechanism of Controlled/"Living" radical Polymerization of Styrene in the Presence of Nitroxyl Radicals. Kinetics and Simulations", *Macromolecules*, 1996, vol. 29, pp. 7661-7670.

* cited by examiner

*Primary Examiner* — Vu A Nguyen
(74) *Attorney, Agent, or Firm* — Thomas F. Roland

(57) ABSTRACT

Transparent and impact-resistant crosslinked acrylic composition consisting of a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C.

12 Claims, 1 Drawing Sheet

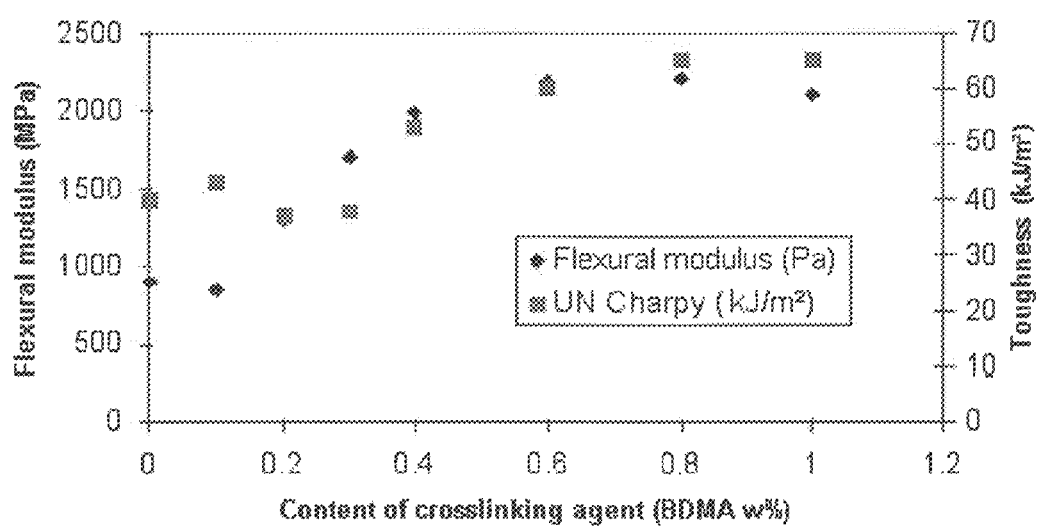

CROSSLINKED NANOSTRUCTURED CAST SHEETS

This application claims benefit, under U.S.C. §119 or §365 of PCT Application Number PCT/FR2011/053168, filed Dec. 22, 2011, and French Patent Application Number FR 10.61113, filed Dec. 23, 2010.

The present invention relates to the field of the impact strengthening of cast acrylic sheets.

FIELD OF THE INVENTION

Polymethyl methacrylate (PMMA) is a material valued for its excellent optical properties (in particular the gloss and a high transparency with a transmission of at least 90% of visible light). However, it is also a brittle impact-sensitive thermoplastic material. This characteristic is related to the fact that the glass transition temperature of PMMA is approximately 110° C., so that, in this material, the polymer chains are not capable of readily moving at ambient temperature. For some applications, it is therefore necessary to improve the impact strength of the PMMA while retaining its transparency.

The impact strengthening of PMMA is generally improved by virtue of the introduction into the acrylic resin of an impact additive, known as core-shell additive, which is provided in the form of multilayer spherical particles. These particles are prepared by emulsion polymerization and are recovered in the powder form by atomization. They generally comprise a sequence of "hard" and "soft" layers. It is thus possible to find two-layer (soft-hard) or three-layer (hard-soft-hard) particles. In the case of cast acrylic sheets, obtained by polymerization of the mixture of monomers in a mold, the impact additive is dispersed beforehand in the mixture of monomers. In the case of extruded acrylic sheets, the impact additive is compounded in the extruder with the acrylic resin. In both cases, it is necessary for the impact additive to be well dispersed within the acrylic resin in order to maintain an unchanging and homogeneous level of impact strength.

BACKGROUND OF THE INVENTION

International application WO 99/29772 describes the impact strengthening of semicrystalline thermoplastic resins using block copolymers of SBM type (styrene-butadiene-methyl methacrylate block copolymers).

International application WO 02/055573 of the Applicant Company describes the impact strengthening of a methacrylate home- or copolymer using a block copolymer of ABA type in which B denotes a block obtained from a diene, for example an SBM.

International application WO 03/062293 of the Applicant Company describes a process of the impact strengthening of a thermoplastic matrix using a $B(-A)_n$ block copolymer composed of a block B and of n branches A and prepared using the controlled radical polymerization technique. This process applies to the strengthening of numerous thermoplastics (PS, PC, PVDF, and the like) and in particular to the manufacture of cast PMMA sheets.

The process of WO 03/062293 applied to the manufacture of cast sheets is not capable of being transferred to the industrial scale. This is because it exhibits the disadvantage of requiring a stage of removal of solvent, followed by a stage of redissolution of the copolymer. First, these two unit operations, by increasing the overall cycle time, affect the yield of the process. Secondly, the stage of removal of solvent is also capable of resulting in the formation of gels in the $B(-A)_n$ copolymer, which affects its redissolution in the mixture of monomers and, consequently, can damage the transparency of the cast sheet.

Furthermore, according to the process described, in particular in the examples, it is preferable, during the 2nd stage, to initiate the formation of the branches A at the same time as that of the matrix. For this, the monomer A is brought into contact with two types of initiators, the conventional radical initiator and the reactivatable block B. The monomer A is thus consumed at the same time according to two competing radical polymerization mechanisms, each exhibiting its own kinetics. The control of this 2nd stage is highly problematic as it implies matching the rates of formation of the blocks A and the matrix. This implies that it is necessary to adjust the nature of the radical initiator to the block B and thus also to carefully adjust the temperature cycle. In practice, contradictory requirements are encountered and the possible compromises generally result:

- in a premature separation during polymerization of the copolymer $B(-A)_n$, which migrates to the interface of the sheet and mold. In this case, sheets are obtained which are impossible to remove from the mold and/or which are partially or completely opaque;
- in unacceptable contents of residual methyl methacrylate, which it is impossible to remove once the sheet is complete.

An improvement is introduced in patent EP 1 858 939. The cycle time of the process of this patent is improved with respect to that described in WO 03/062293 as it does not require any stage of removal of solvent/redissolution.

However, the mechanical properties of the materials obtained with the processes described above are not entirely satisfactory and an improvement in the properties, such as impact strength and the flexural modulus, is desired.

The Applicant Company has now discovered that major improvements in the impact strength and in the flexural modulus are observed when some compositions comprise crosslinking agents.

While the abovementioned documents often mention the possible use of crosslinking agent, none gives examples of or describes the properties of compositions comprising them, in particular the advantage presented by the use of crosslinking agent with a view to a combined increase in the flexural modulus and the impact strength.

SUMMARY OF THE INVENTION

The present invention relates to a transparent and impact-resistant crosslinked acrylic composition consisting of a brittle matrix (1) having a glass transition temperature of greater than 0° C. and of elastomeric domains having a characteristic dimension of less than 100 nm consisting of macromolecular sequences (II) having a flexible nature with a glass transition temperature of less than 0° C., characterized by a number-average molecular weight of between 30000 and 500000 g/mol.

BRIEF DESCRIPTION OF THE DRAWINGS

FIG. 1 shows the Flexural modulus and Charpy impact relative to the crosslinker % for the samples of Examples 1-8.

DETAILED DESCRIPTION

The term "crosslink" is understood to mean a polymer or copolymer, some of its chains of which are connected to one another via covalent bonds or chemical or physical interactions. These chains, connected to one another, are for the most part distributed in the 3 dimensions of the space.

As regards the matrix (I), this exhibits an overall Tg of greater than 0° C., measured by DSC, and is compatible with the methyl methacrylate homo- or copolymer.

The matrix (1) is prepared from methyl methacrylate and optionally one or more monomer(s) chosen from:

acrylic monomers of formula $CH_2=CH-C(=O)-O-R_1$, where $R_1$ denotes a hydrogen atom or a linear, cyclic or branched $C_1-C_{40}$ alkyl group optionally substituted by a halogen atom or a hydroxyl, alkoxy, cyano, amino or epoxy group, such as, for example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;

methacrylic monomers of formula $CH_2=C(CH_3)-C(=O)-O-R_2$, where $R_2$ denotes a hydrogen atom or a linear, cyclic or branched $C_1-C_{40}$ alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;

vinylaromatic monomers, such as, for example, styrene or substituted styrenes, such as α-methylstyrene, monochlorostyrene or tert-butylstyrene.

Methyl methacrylate is predominant. The matrix (I) thus includes a proportion of methyl methacrylate of between 50 and 100%, preferably between 75 and 100% and advantageously between 90 and 100%.

As regards the macromolecular sequences (II) having a flexible nature, these exhibit a glass transition temperature of less than 0° C. (denoted Tg and measured by DSC). Furthermore, the number-average weight of the macromolecular sequences (II) having a flexible nature with a glass transition temperature of less than 0° C. is greater than 30000 g/mol, preferably greater than 60000 g/mol and advantageously greater than 120000 g/mol, but less than 500000 g/mol. The polydispersity is between 1.5 and 2.5.

The macromolecular sequences (II) are prepared from one or more monomer(s) chosen from:

acrylic monomers of formula $CH_2=CH-C(=O)-O-R_1$, where $R_1$ denotes a hydrogen atom or a linear, cyclic or branched $C_1-C_{40}$ alkyl group optionally substituted by a halogen atom or a hydroxyl, alkoxy, cyano, amino or epoxy group, such as, tier example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;

methacrylic monomers of formula $CH_2=C(CH_3)-C(=O)-O-R_2$, where $R_2$ denotes a hydrogen atom or a linear, cyclic or branched $C_1-C_{40}$ alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;

vinylaromatic monomers, such as, for example, styrene or substituted styrenes, α-methylstyrene, monochlorostyrene or tert-butylstyrene.

The macromolecular sequences (II) are not prepared from a diene. A person skilled in the art knows how to combine these monomers so as to adjust:

the overall Tg of the block B. In order to obtain a block B with a Tg of less than 0° C., it is necessary to use at least one monomer exhibiting a Tg of less than 0° C., for example butyl acrylate or 2-ethylhexyl acrylate;

the refractive index of the block B, which has to be as close as possible to that of the matrix (I) in order to provide the best possible transparency when the transparency is required for the targeted application.

The macromolecular sequences (II) can be composed solely of a monomer exhibiting a Tg of less than 0° C., for example butyl acrylate or 2-ethylhexyl acrylate. The macromolecular sequences (II) can also be composed of at least one alkyl acrylate and of a vinylaromatic monomer. Advantageously, the macromolecular sequences (II) are composed of butyl acrylate and styrene in the butyl acrylate/styrene ratio by weight of between 70/30 and 90/10, preferably between 75/25 and 85/15.

As regards the compounds which make the crosslinking possible (the crosslinking agent), they are preferably polyfunctional acrylic monomers, such as, for example, polyol polyacrylates, alkylene glycol polyacrylates or allyl acrylate, ethylene glycol diacrylate, 1,3-butylene glycol diacrylate or 1,4-butylene glycol diacrylate, polyfunctional methacrylic monomers, such as polyol polymethacrylates, alkylene glycol polymethacrylates or allyl methacrylate, ethylene glycol dimethacrylate, 1,3-butylene glycol dimethacrylate or 1,4-butylene glycol dimethacrylate, divinylbenzene or trivinylbenzene. Preferably, it is 1,4-butylene glycol dimethacrylate (BDMA). The content of crosslinking agent is between 0.1 and 2% by weight, with respect to the crosslinked polymer materials which are a subject matter of the invention.

Preferably, the content of crosslinking agent is between 0.4 and 2% by weight, with respect to the crosslinked polymer materials which are a subject matter of the invention, and more preferably still between 0.6 and 0.8% by weight, with respect to the crosslinked polymer materials which are a subject matter of the invention.

According to a first embodiment of the invention, the preparation of cast sheets made of methyl methacrylate homo- or copolymer which are impact-reinforced using the macromolecular sequences (II) comprises the following stages:

1. preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 2;
2. mixing the macromolecular sequences (II) of stage 1 with methyl methacrylate, the crosslinking agent, optionally at least one comonomer M and at least one radical initiator;
3. casting the mixture obtained in stage 2 in a mold and then heating it according to a temperature cycle in order to obtain a cast sheet.

The content of block B (the macromolecular sequences (II)) in the sheet is between 5 and 20% by weight, preferably between 5 and 15% by weight, with respect to the crosslinked polymer material which is a subject matter of the invention.

According to a second embodiment of the invention, the preparation of cast sheets made of crosslinked methyl methacrylate copolymer which are impact-reinforced using a block copolymer $B(-A)_n$ consisting of a block B (the macromolecular sequences (II)) and of n branches A (n being an integer between 1 and 3) comprises the following stages:

1. preparing the block B by mixing, with the monomer(s) intended to form the block B, an alkoxyamine of general formula $Z(-T)_n$, in which Z denotes a polyvalent group, T denotes a nitroxide and n is an integer greater than or equal to 2;
2. preparing the block copolymer $B(-A)_n$ by mixing the block B obtained in stage 1 with the monomer(s) intended to form the branches A; the monomers intended to form the branches A are identical to those of the matrix 1, that is to say methyl methacrylate, and optionally at least one comonomer M, in the absence of the crosslinking agent;
3. mixing the block copolymer $B(-A)_n$ of stage 2 with methyl methacrylate, the crosslinking agent, optionally at least one comonomer M and at least one radical initiator;
4. casting the mixture obtained in stage 3 in a mold and then heating it according to a temperature cycle in order to obtain a cast sheet.

The content of block B (the macromolecular sequences (II)) in the sheet is between 5 and 20% by weight, preferably between 5 and 15% by weight, with respect to the crosslinked polymer material which is a subject matter of the invention.

As regards the block copolymer $B(-A)_n$, the latter is composed of several polymer blocks connected to one another via covalent bonds (see Kirk-Othmer Encyclopedia of Chemical Technology, 3rd ed., Vol. 6, p. 798). The block B is the core of the copolymer and the blocks A represent the branches attached to the block B. The block copolymer $B(-A)_n$ is thus composed of a block B and of n branches, n denoting an integer of greater than or equal to 2, preferably of between 2 and 10 and advantageously of between 2 and 8. The block copolymer $B(-A)_n$, although possessing a block B, has nothing to do with the impact-strengthening agents commonly referred to as core-shell agents, which are composed of substantially spherical particles obtained by emulsion polymerization.

In the context of the invention, it can be a triblock copolymer with, in this case, n=2 (a central block and 2 branches). Examples of triblock copolymer can be:

PMMA-b-poly(n-butyl acrylate)-b-PMMA

PMMA-b-poly(n-butyl acrylate-co-styrene)-b-PMMA

PMMA-b-poly(isobutyl acrylate-co-styrene)-b-PMMA poly(methyl methacrylate-co-n-butyl acrylate)-b-poly(n-butyl acrylate-co-styrene)-b-poly(methyl methacrylate-co-n-butyl acrylate)

(b: symbol used to denote a block copolymer, co: symbol used to denote a random copolymer).

In the case where n>2, the copolymer is said to be a star copolymer.

The block copolymer B(A), is prepared as was described above using an alkoxyamine $Z(-T)_n$ and monomers which make it possible to obtain the block B and the branches A. Preferably, the copolymer $B(-A)_n$ is obtained using the alkoxyamine $Z(-T)_n$ and the controlled radical polymerization technique. By this technique, the branches A are terminated by a nitroxide, all or in part according to the control of the polymerization. The branches can be terminated in part by a nitroxide when, for example, there occurs a transfer reaction between a nitroxide and an alkyl methacrylate, as shown in the reaction below:

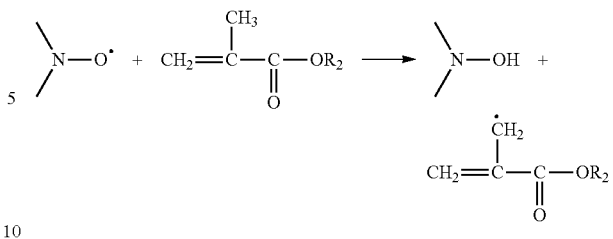

The block copolymer $A(-B)_n$ exhibits a number-average molecular weight of between 40000 and 1000000 g/mol, preferably between 100000 and 1000000 g/mol. The polydispersity index is between 1.5 and 3.0, preferably between 1.8 and 2.7 and more preferably between 1.9 and 2.7.

As regards the alkoxyamine, the latter is described by the general formula $Z(-T)_n$, in which Z denotes a polyvalent group, T denotes a nitroxide and n denotes an integer greater than 2, preferably between 2 and 10, advantageously between 2 and 8.

n represents the functionality of the alkoxyamine, that is to say the number of nitroxide radicals T which can be released by the alkoxyamine according to the mechanism:

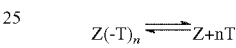

This reaction is activated by the temperature. In the presence of monomer(s), the activated alkoxyamine initiates a polymerization. The preparation of a copolymer polyM2-polyM1-polyM2 based on an alkoxyamine for which n=2 is illustrated in the scheme below. The monomer M1 is first polymerized after activation of the alkoxyamine and then, once the block polyM1 is complete, the monomer M2 is subsequently polymerized:

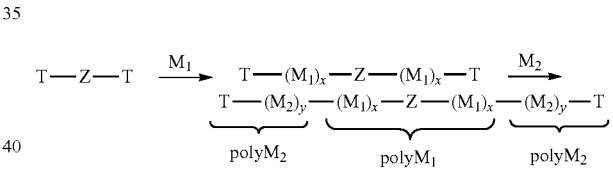

The principle of the preparation of block copolymers remains valid for n>2. Z denotes a polyvalent group, that is to say a group capable of releasing, after activation, several radical sites. The activation in question takes place by cleavage of the covalent bond Z-T.

By way of example, Z can be chosen from the following groups (I) to (VIII):

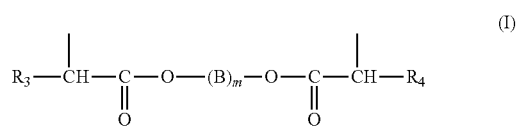

in which $R_3$ and $R_4$, which are identical or different, represent a linear or branched alkyl radical having a number of carbon atoms ranging from 1 to 10, phenyl or thienyl radicals optionally substituted by a halogen atom, such as F, Cl or Br, or else by a linear or branched alkyl radical having a number of carbon atoms ranging from 1 to 4, or else again by nitro, alkoxy, aryloxy, carbonyl or carboxyl radicals; a benzyl radical, a cycloalkyl radical having a number of carbon atoms ranging from 3 to 12, a radical comprising one or more unsaturations; B represents a linear or branched alkylene radical having a number of carbon atoms ranging from 1 to 20; m is an integer ranging from 1 to 10;

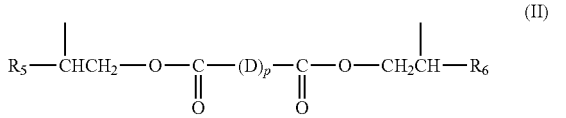
(II)

in which $R_5$ and $R_6$, which are identical or different, represent aryl, pyridyl, furyl or thienyl radicals optionally substituted by a halogen atom, such as F, Cl or Br, or else by a linear or branched alkyl radical having a number of carbon atoms ranging from 1 to 4, or else again by nitro, alkoxy, aryloxy, carbonyl or carboxyl radicals; D represents a linear or branched alkylene radical having a number of carbon atoms ranging from 1 to 6, a phenylene radical or a cycloalkylene radical; p is an integer ranging from 1 to 10;

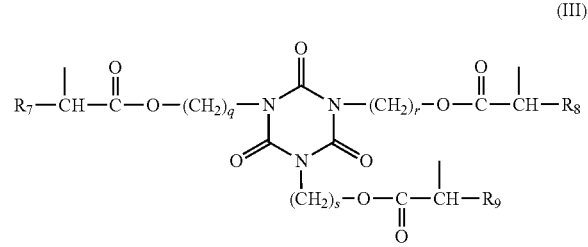
(III)

in which $R_7$, $R_8$ and $R_9$, which are identical or different, have the same meanings as $R_3$ and $R_4$ of the formula (I) and q, r and s are integers ranging from 1 to 10;

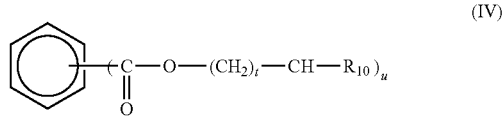
(IV)

in which $R_{10}$ has the same meaning as $R_5$ and $R_6$ of the formula (II), t is an integer ranging from 1 to 4 and u is an integer between 2 and 6 (the aromatic group is substituted);

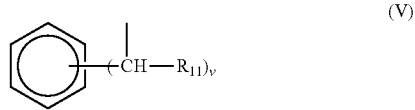
(V)

in which $R_{11}$ has the same meaning as the radical $R_{10}$ of the formula (IV) and v is an integer between 2 and 6;

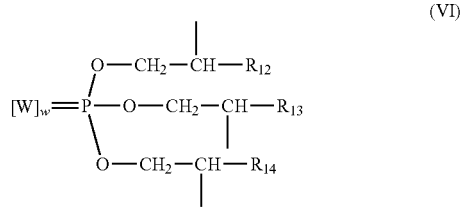
(VI)

in which $R_{12}$, $R_{13}$ and $R_{14}$, which are identical or different, represent a phenyl radical optionally substituted by a halogen atom, such as Cl or Br, or else by a linear or branched alkyl radical having a number of carbon atoms ranging from 1 to 10, W represents an oxygen, sulfur or selenium atom and w is equal to 0 or 1;

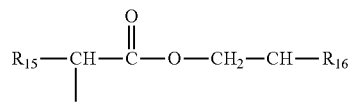
(VII)

in which $R_{15}$ has the same meaning as $R_3$ of the formula (I) and $R_{16}$ has the same meaning as $R_5$ or $R_6$ of the formula (II);

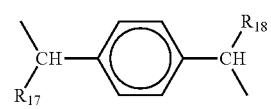
(VIII)

in which $R_{17}$ and $R_{18}$, which are identical or different, represent a hydrogen atom, a linear or branched alkyl radical having a number of carbon atoms ranging from 1 to 10 or an aryl radical optionally substituted by a halogen atom or a heteroatom.

T denotes a nitroxide, which is a stable free radical exhibiting a=N—O. group, that is to say a group on which an unpaired electron is present. The term "stable free radical" denotes a radical which is so long-lasting and unreactive with respect to the air and the moisture in the ambient air that it can be handled and stored for a much longer period of time than the majority of free radicals (see, in this regard, *Accounts of Chemical Research*, 1976, 9, 13-19). The stable free radical is thus distinguished from the free radicals having a short lifetime (of a few milliseconds to a few seconds), such as the free radicals resulting from the usual polymerization initiators, such as peroxides, hydroperoxides or azo initiators. The free radicals which are initiators of polymerization tend to accelerate the polymerization, whereas stable free radicals generally tend to slow it down. It may be said that a free radical is stable within the meaning of the present invention if it is not an initiator of polymerization and if, under the usual conditions of the invention, the mean lifetime of the radical is at least one minute.

T is represented by the structure:

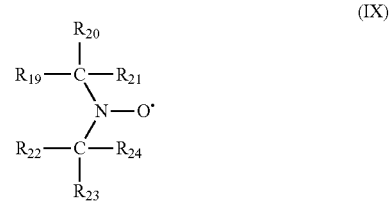
(IX)

in which $R_{19}$, $R_{20}$, $R_{21}$, $R_{22}$, $R_{23}$ and $R_{24}$ denote:
linear or branched $C_1$-$C_{20}$ alkyl groups, such as methyl, ethyl, propyl, butyl, isopropyl, isobutyl, tert-butyl or neopentyl, which are substituted or unsubstituted,
substituted or unsubstituted $C_6$-$C_{30}$ aryl groups, such as benzyl or aryl(phenyl),
saturated $C_1$-$C_{30}$ cyclic groups,
and in which the $R_{19}$ and $R_{22}$ groups can form part of an optionally substituted cyclic structure $R_{19}$—CNC—$R_{22}$ which can be chosen from:

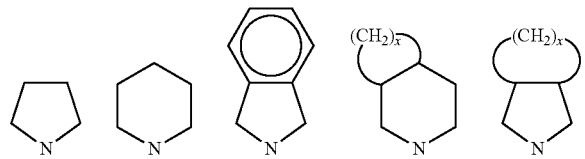

in which x denotes an integer of between 1 and 12.

Use may be made, as examples, of the following nitroxides:

TEMPO    OXO-TEMPO

Particularly preferably, the nitroxides of formula (X) are used in the context of the invention:

$$R_b-\underset{R_L}{\underset{|}{C}}(\overset{R_a}{\overset{|}{H}})-N-O^\bullet \quad (X)$$

$R_a$ and $R_b$ denoting identical or different alkyl groups having from 1 to 40 carbon atoms which are optionally connected to one another, so as to form a ring, and which are optionally substituted by hydroxyl, alkoxy or amino groups, $R_L$ denoting a monovalent group having a molar mass of greater than 16 g/mol, preferably of greater than 30 g/mol. The $R_L$ group can, for example, have a molar mass of between 40 and 450 g/mol. It is preferably a phosphorus group of general formula (XI):

$$\underset{Y}{\overset{X}{>}}\overset{O}{\underset{\|}{P}}- \quad (XI)$$

in which X and Y, which can be identical or different, can be chosen from alkyl, cycloalkyl, alkoxyl, aryloxyl, aryl, aralkyloxyl, perfluoroalkyl or aralkyl radicals and can comprise from 1 to 20 carbon atoms; X and/or Y can also be a halogen atom, such as a chlorine, bromine or fluorine atom.

Advantageously, $R_L$ is a phosphonate group of formula:

$$\underset{R_d-O}{\overset{R_c-O}{>}}\overset{O}{\underset{\|}{P}}- \quad (XII)$$

in which $R_c$ and $R_d$ are two identical or different alkyl groups which are optionally connected, so as to form a ring comprising from 1 to 40 carbon atoms, and which are optionally substituted or unsubstituted.

The group $R_L$ can also comprise at least one aromatic ring, such as the phenyl radical or the naphthyl radical, for example substituted by one or more alkyl radical(s) comprising from 1 to 10 carbon atoms.

The nitroxides of formula (X) are preferred as they make it possible to attain good control of the radical polymerization of (meth)acrylic monomers, as is taught in WO03/062293. The alkoxyamines of formula (XIII), having a nitroxide of formula (X), are thus preferred:

$$\left(R_b-\underset{R_L}{\underset{|}{C}}(\overset{H}{\overset{|}{\phantom{C}}}\overset{R_a}{\phantom{C}})-N-O\right)_n-Z \quad (XIII)$$

in which:
Z denotes a polyvalent group and n is an integer greater than or equal to 1;

$R_a$ and $R_b$ denote identical or different alkyl groups having from 1 to 40 carbon atoms which are optionally connected to one another, so as to form a ring, and which are optionally substituted by hydroxyl, alkoxy or amino groups, $R_L$ denotes a monovalent group having a molar mass of greater than 16 g/mol, preferably of greater than 30 g/mol. The $R_L$ group can, for example, have a molar mass of between 40 and 450 g/mol. It is preferably a phosphorus group of general formula (XI):

$$\underset{Y}{\overset{X}{>}}\overset{O}{\underset{\|}{P}}- \quad (XI)$$

in which X and Y, which can be identical or different, can be chosen from alkyl, cycloalkyl, alkoxyl, aryloxyl, aryl, aralkyloxyl, perfluoroalkyl or aralkyl radicals and can comprise from 1 to 20 carbon atoms; X and/or Y can also be a halogen atom, such as a chlorine, bromine or fluorine atom.

Advantageously, $R_L$ is a phosphonate group of formula:

$$\underset{R_d-O}{\overset{R_c-O}{>}}\overset{O}{\underset{\|}{P}}- \quad (XII)$$

in which $R_c$ and $R_d$ are two identical or different alkyl groups which are optionally connected, so as to form a ring comprising from 1 to 40 carbon atoms, and which are optionally substituted or unsubstituted.

The group $R_L$ can also comprise at least one aromatic ring, such as the phenyl radical or the naphthyl radical, for example substituted by one or more alkyl radical(s) comprising from 1 to 10 carbon atoms.

Mention may be made, as examples of nitroxide of formula (X) which can be carried by the alkoxyamine (XIII), of:
N-(tert-butyl)-1-phenyl-2-methylpropyl nitroxide,
N-(2-hydroxymethylpropyl)-1-phenyl-2-methylpropyl nitroxide,
N-(tert-butyl)-1-dibenzylphosphono-2,2-dimethylpropyl nitroxide,
N-(tert-butyl)-1-di(2,2,2-trifluoroethyl)phosphono-2,2-dimethylpropyl nitroxide,
N-(tert-butyl)-1-diethylphosphono-2-methylpropyl nitroxide,
N-(1-methylethyl)-1-cyclohexyl-1-diethylphosphono nitroxide,
N-(1-phenylbenzyl)-1-diethylphosphono-1-methylethyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphonomethylethyl nitroxide, or also the nitroxide of formula

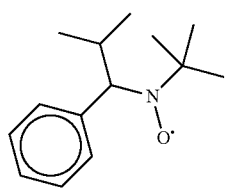

The nitroxide of formula (XIV) is particularly preferred:

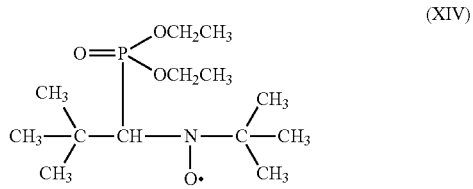

It is N-(tert-butyl)-1-diethylphosphono-2,2-dimethylpropyl nitroxide, commonly referred to as SG1 for simplicity.

The alkoxyamine (I) and in particular alkoxyamine (XIII) can be prepared by recipes described, for example, in U.S. Pat. No. 5,910,549 or in FR99.04405. One method which can be used consists in carrying out the coupling of a carbon-based radical with a nitroxide. The coupling can be carried out starting from a halogenated derivative in the presence of an organometallic system, such as CuX/ligand (X=Cl or Br), according to a reaction of ATRA (Atom Transfer Radical Addition) type such as described by D. Greszta et al, in *Macromolecules*, 1996, 29, 7661-7670.

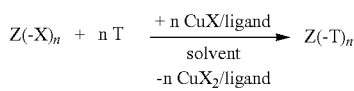

The alkoxyamines which can be used in the context of the invention are represented below:

DIAMINS:

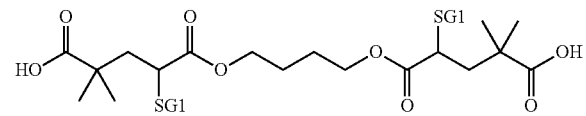

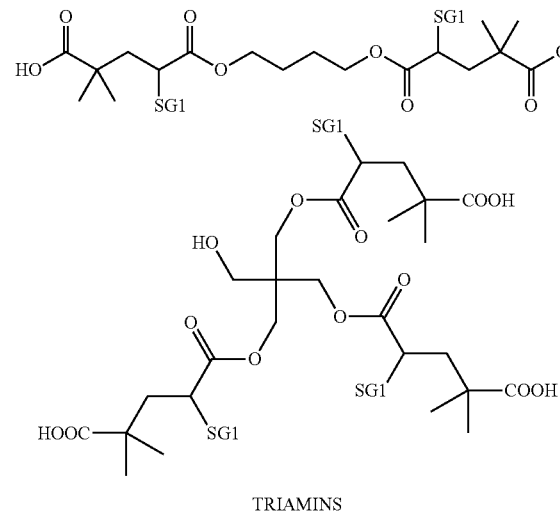

TRIAMINS

Preferably, DIAMINS is used.

It would not be departing from the scope of the present invention to combine several alkoxyamines corresponding to the formula (I), in particular several alkoxyamines of formula (XIII). These mixtures might thus comprise, for example, an alkoxyamine having n1 nitroxides attached and an alkoxyamine having n2 nitroxides attached, with n1 different from n2. A combination of alkoxyamines carrying different nitroxides might also be concerned.

As regards the radical initiator, it can be chosen from diacyl peroxides, peroxyesters, dialkyl peroxides, peroxyacetals or azo compounds. Radical initiators which may be suitable are, for example, isopropyl carbonate, benzoyl peroxide, lauroyl peroxide, caproyl peroxide, dicumyl peroxide, tert-butyl perbenzoate, tert-butyl per-2-ethylhexanoate, cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, 1,1-di(t-amylperoxy)cyclohexane, tert-butyl peroctoate, azodiisobutyronitrile (AIBN), azodiisobutyramide, 2,2'-azobis(2,4-dimethylvaleronitrile), 4,4'-azobis(4-cyanopentanoic acid) or 1,1'-azobis(cyanocyclohexane). It would not be departing from the scope of the invention to use a mixture of radical initiators chosen from the above list. The preferred radical initiator is 1,1-di(t-amylperoxy)cyclohexane.

The content of radical initiator with respect to the monomers of the mixture which is cast in the mold varies from 100 to 2000 ppm by weight, preferably between 200 and 1000 ppm by weight. This content can vary as a function of the application and of the thickness targeted.

Other ingredients can be optionally added to the mixture which is cast in the mold (during stage 3 of the process according to the invention or stage 1 of the alternative form). Mention may be made, without implied limitation, of:
- opacifying fillers, such as $TiO_2$ or $BaSO_4$, generally used in the form of pastes prefabricated in a plasticizer of dialkyl phthalate type;
- colored organic dyes or colored inorganic pigments;
- plasticizers;
- UV-stabilizing additives, such as Tinuvin P from Ciba, used at contents of 0 to 1000 ppm and preferably 50 to 500 ppm, with respect to the mixture which is cast in the mold;
- light or heat stabilizers, such as, for example, Tinuvin 770;
- antioxidants;
- flame-retarding additives, such as, for example, tris(2-chloropropyl) phosphate;
- thickening agents, such as, for example, cellulose acetate butyrate;
- mold-release agents, such as, for example, dioctyl sodium sulfosuccinate, used at contents of 0 to 500 ppm and preferably 0 to 200 ppm, with respect to the mixture which is cast in the mold;
- inorganic or organic fillers (for example polyamide, PTFE or $BaSO_4$) intended to scatter light (for example, to give sheets which can be edge-lit).

The other ingredient can also (optionally) be a chain-limiting agent commonly used in the field of cast sheets, for example γ-terpinene or terpinolene. The preferred chain-limiting agent is γ-terpinene at contents of between 0 and 500 ppm and preferably between 0 and 100 ppm, with respect to the monomers of the mixture which is cast in the mold.

The chain-limiting agent can also be added before the formation of the branches A (during stage 2 of the second embodiment according to the invention) at contents of between 0 and 500 ppm and preferably between 0 and 100 ppm, with respect to the monomer(s) intended to form the branches A.

The impact strengthening according to the invention is produced by virtue of the macromolecular sequences (H) but the addition of impact-strengthening additives of core-shell type in synergy with the copolymer B(-A)$_n$ is not ruled out. These additives of core-shell type are known to a person skilled in the art and can, for example, be of the soft-hard or hard-soft-hard type, in particular those sold under the Durastrength® or Metablend® (for example, D320) trade marks of Arkema. The proportion of additives of core-shell type/block copolymer B(-A)$_n$ can thus be between 90/10 and 10/90.

The process of the invention lends itself to the manufacture of cast sheets having a thickness of 2 to 30 mm and preferably of 2.5 to 12 mm.

As regards the process, the latter comprises the following stages:

During the 1st stage, the block B is prepared by mixing the alkoxyamine Z(-T)$_n$ and the monomer(s) intended to form the block B and by heating the mixture obtained at a temperature sufficient to activate the alkoxyamine.

It is possible to also add nitroxide to the mixture in order to provide better control of the polymerization. The nitroxide which is added can be identical to that which is carried on the alkoxyamine or different. The molar proportion of the nitroxide added with respect to the alkoxyamine is between 0 and 20%, preferably between 0 and 10%.

The conversion can vary between 10 and 100%. However, preferably, the polymerization is halted for a conversion of between 50 and 100% and advantageously between 50 and 80%.

This stage can be carried out in a closed reactor or in an open reactor, for example a reactor of plug-flow type. Preferably, the reactor is a closed reactor. The block B is prepared at a temperature of between 80 and 150° C., preferably between 80 and 130° C. This temperature is related to the alkoxyamine and to the monomer(s) used. The duration of the polymerization can vary between 30 minutes and 8 hours, preferably between 1 and 8 hours, advantageously between 2 and 6 hours. It is preferable to avoid the presence of oxygen. To do this, the reaction mixture is generally degassed under reduced pressure and the reactor is rendered inert by flushing with nitrogen or with argon after introducing the reactants.

On conclusion of this 1st stage, the block B, optionally mixed with the unconsumed monomer(s), is obtained. They can be removed by distillation under reduced pressure at a temperature of less than 80° C. In the context of the first embodiment of the invention, the block B constituting the macromolecular sequences (H) is mixed with methyl methacrylate, the crosslinking agent, optionally at least one comonomer M and at least one radical initiator and is then cast in a mold, which is subsequently subjected to a temperature cycle in order to obtain a cast sheet. The thermal cycle comprises a first stationary phase with a temperature of between 60 and 120° C. for a time which can vary from 2 to 6 hours, followed by a second stationary phase with a temperature of between 100 and 150° C. for a time which can vary from 1 to 4 hours.

According to the second embodiment of the invention, the block B, optionally mixed with the unconsumed monomer(s) from the 1st stage, is subjected to a 2nd stage of polymerization in the presence of the monomer(s) intended to form the branches A, with the exclusion of the crosslinking agent.

This stage can be carried out in the same reactor as the reactor employed in the 1st stage or in another reactor. Preferably, the reactor is the same closed reactor.

If the conversion of the 1st stage is less than 100%, the not completely polymerized monomer(s) from the 1st stage may be found in the mixture. The mixture thus comprises the block B, the monomer(s) intended to form the block A which has/have been added and possibly the monomer(s) not completely polymerized in the 1st stage. The proportion of block B in this mixture is between 1 and 20%, preferably between 5 and 15%.

The branches A are formed at a temperature of between 80 and 150° C., preferably between 80 and 130° C. The duration of the polymerization can vary between 30 minutes and 8 hours, preferably between 1 and 4 hours, advantageously between 1 and 2 hours. As during stage 1, it is preferable to avoid the presence of oxygen. To do this, the reaction mixture is generally degassed under reduced pressure and the reactor is rendered inert by flushing with nitrogen or with argon after introducing the reactants. It is also possible to envisage adding nitroxide during this stage, it being possible for this nitroxide to be different from that carried by the alkoxyamine. The proportion of nitroxide added at this stage is between 0 and 20 mol %, with respect to the alkoxyamine, preferably between 0 and 10 mol %, During the 2nd stage, the conversion can vary between 10 and 100%. However, in order not to obtain an excessively viscous mixture, it is preferable to limit the conversion to between 5 and 50%, preferably between 5 and 30%, so that the mixture obtained on conclusion of this 2nd stage comprises the block copolymer B(-A)$_n$ mixed with the unconverted monomer(s). This mixture is commonly referred to as "syrup".

During the 3rd stage, still according to the second embodiment of the invention, methyl methacrylate, the crosslinking agent, optionally at least one other monomer M, at least one radical initiator and optionally a chain-limiting agent are added to the mixture obtained in the 2nd stage.

This stage, carried out at ambient temperature, can be carried out in another reactor or preferably in the same reactor as that used in the 2nd stage. Advantageously, the same closed reactor is used for the three stages which have just been described.

During the 4th stage, the mixture from the 3rd stage is cast in a mold and then heated. This final stage is very similar to that which may be encountered in the case of the processes for the manufacture of acrylic sheets already known. The mold is formed of two glass sheets separated by a seal made of PVC, for example. The heating can, for example, consist in using a vessel filled with water or a ventilated oven in which the molds with their mixture are placed in a row and which has a temperature which is modified.

According to the invention, the heating can be carried out at a constant temperature (isotherm) or else it can follow a very precise temperature program. The temperature program generally comprises a first stationary phase at a temperature of the order of 70° C., followed by a second stationary phase at a temperature of the order of 120° C. After cooling, the sheet obtained is removed from the mold.

The process of the present invention is applicable to the production of industrial acrylic sheets of various thicknesses. A person skilled in the art knows how to adapt the manufacturing process, in particular as regards the 3rd stage (choice of the radical initiator and of the temperature program), according to the thickness of the acrylic sheet.

As regards the cast sheet, the latter comprises a crosslinked methyl methacrylate copolymer which constitutes the matrix in which the macromolecular sequences (II) are homogeneously dispersed. The macromolecular sequences (II) have a tendency to settle down inside the matrix to give homogeneously distributed domains. The matrix thus constitutes a continuous phase of crosslinked methyl methacrylate copolymer. The domains, visible using electron microscopy or an atomic force microscope, exist in the form of nodules having a size of less than 100 nm. The size of the domains is estimated from the atomic force microscope analyses.

The sheets manufactured according to the present invention can be used as windows, noise-reducing walls, flat screens, and the like, or else can be converted to various articles by thermoforming, cutting out, polishing, adhesive bonding or folding. These sheets can be used in particular to manufacture bathroom fittings (baths, sinks, shower trays, and the like). For this, the sheets are thermoformed in a way known to a person skilled in the art.

The molecular weights are determined by steric exclusion chromatography (SEC) or gel permeation chromatography (GPC). The polymers are dissolved at 1 g/l in THF stabilized with BHT. The calibration is carried out using monodisperse polystyrene standards.

Differential Scanning calorimetry (DSC), in order to estimate the glass transition temperature Tg, is carried out according to Standard ISO 11357-2.

EXAMPLES

1st stage: Preparation of a block B based on butyl acrylate and on styrene The following are introduced into a 2 liter metal reactor equipped with a propeller mixer, with a jacket for heating by circulation of oil and with a vacuum/nitrogen line:

616 g of butyl acrylate
84 g of styrene
2.4 g of dialkoxyamine DIAMS (purity of 94% and free SG1 of 0.35%), i.e. 2.3 g of pure DIAMS
0.09 g of SG1 with a purity of 85% (i.e., 0.077 g of pure SG1), which represents a 5 mol % excess per alkoxy functional group carried by the DIAMS, taking into account the 0.35% of free SG1 already present in the DIAMS.

After introduction of the reactants, the reaction mixture is degassed three times under vacuum/nitrogen. The reactor is then closed and then stirring (50 rev/min) and heating (set temperature: 125° C.) are begun. The temperature of the reaction mixture is 113° C. in approximately 30 min. The pressure stabilizes at approximately 1.5 bar. The temperature of the reactor is kept stationary at 115° C. for 522 min. After cooling, 608 g of a mixture with a solids content of 67% are recovered. The excess butyl acrylate is subsequently removed by evaporation at 70° C. under reduced pressure for 3 h and replaced with 700 g of MMA. 1110 g of a 37% solution in MMA of a "stripped" macroradical (freed from its excess butyl acrylate) are thus recovered. The butyl acrylate:styrene ratio by weight of the macroradical obtained is 83:17. The GPC analysis of the block B gives the following results: $M_n$: 120000 g/mol; $M_w$: 252000 g/mol; polydispersity: 2.1.

Stage 2

The sheets are produced from a mixture of 10% by weight of a poly(butyl acrylate-co-styrene) macroinitiator macromolecular sequence prepared in stage 1, of methyl methacrylate, of 1,4-butylene glycol dimethacrylate (BDMA, in amounts which can vary according to the test under consideration) and of 800 ppm of 1,1-di(t-amyl-peroxy)cyclohexane. The mixture is subsequently cast in a mold. The mold is first heated at a temperature of approximately 90° C. for approximately 3 hours.

The sheet is subsequently subjected to a postpolymerization at a temperature of approximately 130° C. for approximately 2 hours.

| TEST | % BDMA | Flexural modulus (MPa) | Unnotched Charpy impact (kJ/m$^2$) |
|---|---|---|---|
| 1 | 1 | 2100 | 65 |
| 2 | 0.8 | 2200 | 65 |
| 3 | 0.6 | 2180 | 60 |
| 4 | 0.4 | 1983 | 53 |
| 5 | 0.3 | 1700 | 38 |
| 6 | 0.2 | 1300 | 37 |
| 7 | 0.1 | 851 | 43 |
| 8 | 0 | 900 | 40 |

It is observed in FIG. 1 that the impact strength (toughness) and the flexural modulus are an increasing function of the content of crosslinking agent with a maximum in the vicinity of 0.7%.

The invention claimed is:

1. A transparent and impact-resistant crosslinked acrylic composition comprising:
   a brittle matrix (I) having a glass transition temperature of greater than 0° C.,
   elastomeric domains having a characteristic dimension of less than 100 nm consisting of from 5 and 20% by weight macromolecular sequences (II) having a flexible nature with a glass transition temperature of less than 0° C., characterized by a number-average molecular weight of between 30,000 and 500,000 g/mol, and
   between 0.1 and 2% by weight of a crosslinking agent, with respect to the crosslinked polymer material, wherein said crosslinking agent is selected from the group consisting of one 1,4-butylene glycol dimethacrylate, and 1,3-butylene glycol dimethacrylate, and mixtures thereof,
   wherein said macromolecular sequence does not contain any diene.

2. The composition as claimed in claim 1, in which the macromolecular sequences (II) are prepared from monomers selected from the group consisting of acrylic monomers of formula $CH_2=CH-C(=O)-O-R_1$, where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, methacrylic monomers of formula $CH_2=C(CH_3)-C(=O)-O-R_2$, where $R_2$ denotes a hydrogen atom or a linear, cyclic or branched $C_1$-$C_{40}$ alkyl group optionally substituted by a halogen atom or a hydroxyl, alkoxy, cyano, amino or epoxy group, and vinylaromatic monomers.

3. The composition as claimed in claim 1, in which the macromolecular sequences (II) are prepared from butyl acrylate and styrene in a butyl acrylate/styrene ratio by weight of between 70/30 and 90/10.

4. The composition as claimed in claim 1, further comprising the decomposition products of an alkoxyamine of general formula $Z(-T)_n$ in which Z denotes a polyvalent group, T denotes a nitroxide and n is an integer greater than or equal to 2.

5. The composition as claimed in claim 4, in which the alkoxyamine corresponds to the following formula:

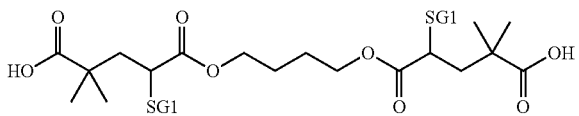

SG1 being N-(tert-butyl)-1-diethylphosphono-2,2-dimethylpropyl nitroxide.

6. The composition as claimed in claim 4, in which the alkoxyamine corresponds to the following formula:

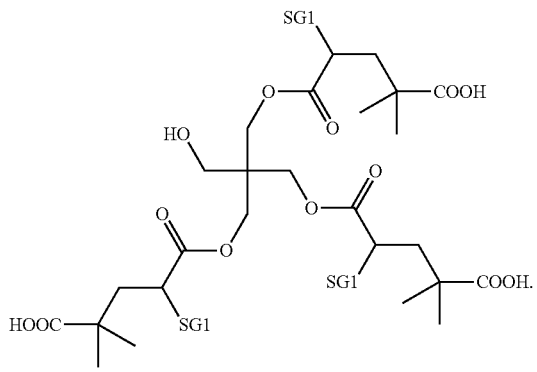

7. A process for the preparation of a transparent and impact-resistant crosslinked acrylic composition consisting of a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized by a number-average molecular weight of between 30,000 and 500,000 g/mol, in which the content of crosslinking agent is between 0.1 and 2% by weight, with respect to the crosslinked polymer material, comprising the following steps:
1. preparing the macromolecular sequences (II) by mixing, with one or more monomer(s) intended to form the macromolecular sequences (II), an alkoxyamine of general formula $Z(-T)_n$, in which Z denotes a polyvalent group, T denotes a nitroxide and n is an integer greater than or equal to 2;
2. mixing the macromolecular sequences (II) of stage 1 with methyl methacrylate, the crosslinking agent, optionally at least one comonomer M and at least one radical initiator;
3. casting the mixture obtained in stage 2 in a mold and then heating it according to a temperature cycle in order to obtain a cast sheet.

8. The process as claimed in claim 7, further comprising adding to the mixture which is cast in the mold during stage 3 of the process, another ingredient chosen from:
opacifying fillers, in the form of pastes prefabricated in a dialkyl phthalate plasticizer;
colored organic dyes or colored inorganic pigments;
plasticizers;
UV-stabilizing additives, used at contents of 0 to 1000 ppm, with respect to the mixture which is cast in the mold;
light or heat stabilizers;
antioxidants;
flame-retarding additives;
thickening agents;
mold-release agents used at contents of 0 to 500 ppm, with respect to the mixture which is cast in the mold;
inorganic or organic fillers intended to scatter light.

9. An item comprised of the composition as claimed in claim 1.

10. The item as claimed in claim 9 wherein said item is part of a window, noise-reducing wall, flat screen, or bathroom fitting.

11. The composition as claimed in claim 2, wherein said acrylic monomers are selected from the group consisting of acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates and acrylonitrile, said methacrylic monomers are selected from the group consisting of methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates and methacrylonitrile, and said vinylaromatic monomers are selected from the group consisting of styrene, substituted styrenes, α-methylstyrene, monochlorostyrene and tert-butylstyrene.

12. The process of claim 8, wherein said opacifying fillers are selected from the group consisting of $TiO_2$ and $BaSO_4$, in the form of pastes prefabricated in a dialkyl phthalate plasticizer; said UV-stabilizing additive is 2-(2H-benzotriazol-2-yl)-p-cresol and bis(2,2,6,6-tetramethyl-4-piperidyl)sebaceate; said UV-stabilizing additive is used at 50 to 500 ppm, with respect to the mixture which is cast in the mold; said light or heat stabilizers is 2-(2H-benzotriazol-2-yl)-p-cresol and bis(2,2,6,6-tetramethyl-4-piperidyl)sebaceate; said flame-retarding additive is tris(2-chloropropyl) phosphate; said thickening agent is cellulose acetate butyrate; said mold-release agent is dioctyl sodium sulfosuccinate, used at 0 to 200 ppm, with respect to the mixture which is cast in the mold; and said inorganic or organic fillers are selected from the group consisting of polyamides, polytetrafluroethylene (PTFE) and $BaSO_4$.

* * * * *